2,773,793

MODIFIED MELAMINE RESINS

George L. Fraser, Wilbraham, and Curtis Elmer, Springfield, Mass., assignors to Monsanto Chemical Company, St. Louis, Mo., a corporation of Delaware No Drawing. Application March 19, 1953,
Serial No. 343,492

6 Claims. (Cl. 154—128)

This invention relates to melamine resins. More particularly the invention relates to melamine resins modified to increase the flow thereof during forming operations.

Melamine resins are becoming increasingly important in the fields of thermosetting molding compounds, laminating syrups, and surface coating materials. As a general rule they are colorless or light-colored and have good resistance to chemicals and to weathering. One of the major obstacles in the use of these resins is their resistance to flow during the forming operations. To cure the fault, several methods have been tried with varying success among which are the reaction of the melamine-aldehyde condensates with alcohols and with both an alcohol and an aryl sulfonamide. One such solution is to leave in the resin a fairly large percentage of volatile material such as water, alcohol or organic solvent. This method improves the flow characteristics but presents problems of porosity and decreases the resistance to weathering and impairs gloss and general surface appearance.

One object of this invention is to provide modified melamine resins.

A further object of this invention is to increase the flow of melamine resins without detracting from the physical and chemical properties thereof.

These and other objects are attained by mixing with a melamine resin a small proportion of an aromatic biguanide.

The following examples are given in illustration and are not intended as limitations on the scope of this invention. Where parts are mentioned they are parts by weight.

Example I

Mix 126 parts (1 mol) of melamine and 243 parts (3 mols) of formalin (37% aqueous solution of formaldehyde). Adjust the pH of the mixture to about 8.5–9.5 with aqueous sodium hydroxide. Heat the mixture at reflux temperature and atmospheric pressure until the hydrophobe point is reached, i. e., until a sample of the mixture becomes cloudy when dropped into cold water (about 25° C.). Cool the mixture to about 60° C. and add 1 part of phenyl biguanide with agitation and then cool the reaction mixture to room temperature. The product is an aqueous solution of a trimethylol melamine containing the phenyl biguanide in physical admixture. The solution may be used without change as a laminating syrup or the water may be removed therefrom by conventional methods such as spray drying, vacuum drying, kettle drying, etc. to recover a white pulverulent material which is still water-soluble.

Example II

To prepare a laminate, impregnate alpha cellulose paper with the resin of Example I by dipping it into the aqueous syrup of Example I and withdrawing it slowly from the syrup and drawing through squeeze rolls. A resin pickup of about 60% by weight is obtained. Dry separate portions of the impregnated paper to 4.5% and 3.5% volatiles respectively. Test the impregnated paper in a laminate for flow properties according to the test described hereinbelow. A laminate prepared from the paper having a volatile content of about 4.5% has a flow of about 30% and a laminate prepared from the paper having a volatile content of about 3.5% has a flow of about 12%.

When the same flow test is applied to paper impregnated with a melamine-formaldehyde condensate prepared as in Example I without the addition of the phenyl biguanide, the flow is about 5% at 4.5% volatiles and does not reach 12% until the volatiles have been increased to about 7%.

Example III

Mix 126 parts (1 mol) of melamine and 243 parts (3 mols) of formalin (37% aqueous solution of formaldehyde). Adjust the pH of the mixture to about 8–9.5 with aqueous sodium hydroxide. Heat the mixture at reflux temperature and atmospheric pressure until the hydrophobe point is reached and then recover the reaction product by spray drying. A white amorphous powder is obtained which is soluble in water. It is substantially trimethylol melamine.

Dissolve 100 parts of the melamine-formaldehyde condensate in about 70 parts of water and 30 parts of ethanol and add thereto 1 part of o-tolyl biguanide. Prepare a laminate by impregnating paper with the above solution to a resin pickup of about 60% by weight, drying the paper to about 3.5% volatiles, and heating 12 superimposed pieces of the impregnated paper at 1000 p. s. i. and 150° C. for 3 minutes. A flow of about 12% is obtained.

Example IV

Blend 100 parts of pulverulent trimethylol melamine with 2 parts of chlorphenyl biguanide and 100 parts of alpha floc until the ingredients are thoroughly intermingled. Mold the blend in a cup-shaped mold at 1000 p. s. i. and 150° C. for ten minutes. On cooling a cup is obtained having a high gloss finish. It will be found that the melamine-biguanide mixture has not only had sufficient flow to fill out the mold completely and accurately but also it has had enough flow to completely impregnate and cover substantially all of the individual fibers. As a result, the resistance of the surface of the molded cup to chemical and physical deterioration is dependent solely on the resin and is not related to the resistance of the fibers. Moldings prepared from this mixture retain the added impact strength imparted by cellulose fibers.

Example V

Prepare a laminating syrup by reacting together 126 parts of melamine and 220 parts of formalin under alkaline conditions until the hydrophobe point is reached. Cool the reaction mixture and add thereto 1.5 parts of N'-phenyl-N"-diethyl biguanide. Impregnate glass cloth with the resulting solution to a resin pickup of about 65% and then dry the impregnated cloth to a volatiles content of about 1.7%. Cut the cloth into 10 pieces of equal dimensions and laminate the ten pieces together at 150° C. and 150 p. s. i. The laminate produced shows excellent homogeneity and is substantially impervious to water. A similar laminate made with a methylol melamine without the biguanide shows less homogeneity and is considerably less resistant to water. The volatiles in impregnated materials to be laminated exert a strong influence on the flow in the laminating process with the flow increasing with increasing volatiles content. The volatiles are mainly water. Unfortunately an increased amount of volatiles in the impregnated materials prior to lamination cause many and serious defects in laminates prepared therefrom.

When enough volatile material is left in the impregnated material to give a flow of 12% (10–14% flow has been found optimum for good laminations), the resulting laminates contain bubbles, pock marks, poor gloss and haziness if methylol melamine resin alone is used as the impregnant. But when the laminating syrups of this invention are used, the amount of volatile material may be reduced to less than 3% without decreasing the flow below the optimum for good lamination. As a result substantially perfect laminates may be prepared easily and with a minimum of control.

The test used in the laminating industry to measure the flow of the resin impregnants during the laminating step is as follows:

Prepare 12 substantially circular discs of the impregnated material, the discs being conveniently about 1.5 inches in diameter. Weigh the discs. Then assemble the discs into a pile and weigh. Then press under 1000 p. s. i. pressure at 150° C. for 3 minutes. Cool the laminate, cut off the flash, and weigh the laminate. The percent flow is calculated by dividing the difference between the weight of the trimmed laminate and the original plys by the original weight.

The melamine resins of this invention are condensates of melamine and formaldehyde in which 1 mol of melamine is reacted with from 1 to 6 mols of formaldehyde. For molding compositions the resins generally will contain larger amounts of formaldehyde i. e. from 3 to 6 mols and for laminating syrups the amount of formaldehyde will range from 2 to 4 mols. Part of the melamine may be replaced by other aminotriazines or by urea, thiourea, dicyandiamide, etc. For some purposes it is desirable to blend the melamine resin and the biguanide with small proportions of melamine ethers and co-condensates of melamine, formaldehyde and an aryl sulfonamide or a combination of aryl sulfonamide and an alcohol. It is also possible to replace a part of the formaldehyde with other aldehydes such as butyraldehyde, furfural, cyclohexanone etc. However, in general it is satisfactory to use the melamine-formaldehyde condensates without further modification.

For use in laminating processes, it is preferred to control the reaction between the melamine and formaldehyde so that the condensation product is water-soluble or easily water-dispersible. These condensates may be easily prepared by reacting the melamine with the formaldehyde under reflux conditions at a pH of 8–10 until the hydrophobe point is used. The reaction medium generally contains enough water so that the reaction product may be used directly for impregnating the material to be laminated. However, the condensation product may be recovered by conventional drying means such as spray drying, oven drying etc. and the dried material redispersed in water or water-alcohol mixtures as needed.

The biguanides which are effective as flow promoters for the melamine resins are aromatic biguanides which dissociate in water to give a pH of 10–12. The biguanides have the following formula

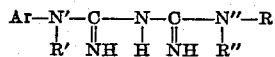

in which Ar represents a phenyl group or a naphthalene group or a ring substituted derivative thereof in which the ring-substituents are alkyl groups or chlorine atoms and R, R' and R'' may be hydrogen or alkyl groups containing up to and including 6 carbon atoms. R, R' and R'' may be the same or different within the above described limits. Other operable biguanides than those shown in the examples are alkyl-phenyl biguanides, mono- or polychloro phenyl biguanides, N'-phenyl N'' dialkyl biguanides, N'-phenyl-N''-alkyl biguanides, etc.

The amount of biguanide used may vary from 0.1 to 5.0 parts per 100 parts of melamine-formaldehyde condensate on a dry basis. The effect on the flow of the melamine-formaldehyde condensate is pronounced with as little as 0.1 part of biguanide and the flowability increases with increasing amounts of biguanide. Maximum flow without substantial loss of the beneficial properties of the melamine-formaldehyde condensates is obtained with from 4 to 5 parts of biguanide. Beyond this amount the chemical and physical properties of the biguanides begin to exert a strong influence on the properties of the melamine resins so that moldings and laminates made therewith no longer have the advantageous properties of the melamine resins.

The laminating syrups of this invention are either water or water-alcohol solutions or dispersions of the melamine-formaldehyde condensate and the biguanide. No catalyst need be added to the solutions and generally it is not desirable to use a catalyst. However under some conditions the cure of the laminates may be hastened by the incorporation of a small amount of an acid catalyst in the laminating syrup.

The compositions of this invention whether in the dry state or in solution in water or an alcoholic solvent may be used as laminating media for natural and synthetic fibers and for mats, felts, paper, webs etc., made therefrom by weaving, felting and other conventional methods. Among the materials to which the compositions may be applied are cellulosic fibers either in the fiber form or in the form of paper or woven textiles, glass fibers in the form of rovings, mats or cloth, woolen textiles, superpolyamide fibers, acrylonitrile fibers, vinylidene chloride fibers, polyester fibers etc.

The compositions of this invention cure to an insoluble infusible state at temperatures ranging from 100° C. to 200° C. In their cured state they are hard and tough and have a high degree of gloss if the mold or press surface is smooth. The curing operation should be carried out under pressures ranging upwards from 25 p. s. i. depending in part on the compressibility of the treated fibers and the degree of compression desired.

Laminates may be prepared in which each of the lamina is impregnated with the compositions of this invention. Laminates may also be prepared in which only the top and bottom lamina are so impregnated. Thus the inner laminae may contain phenolic resins, polyester resins, etc. with the facing laminae containing the resins of this invention. Decorative laminates in which the decoration is carried by the first sub-lamina and in which the top lamina or overlay contains the resins of this invention are particularly attractive due to the high gloss and chemical resistance of the biguanide admixed melamine-formaldehyde resins.

Plain and decorative laminates from paper, plywood, fiberglass laminates, paper laminates having a fabric decorative lamina etc., may all be made advantageously with the compositions of this invention.

What is claimed is:

1. In the method for preparing a laminate in which a plurality of resin-impregnated layers of fibrous material are assembled in superimposed relationship, placed under pressure and heated until the resin has cured, the improvement which comprises impregnating said fibrous material with a mixture of 95.0–99.9% by weight of a low molecular weight melamine-formaldehyde condensate and, correspondingly, 5.0–0.1% by weight of an aromatic biguanide which dissociates in water to yield a pH of from 10 to 12, said aromatic biguanide having the formula:

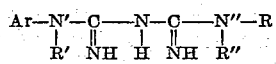

wherein Ar is taken from the group consisting of phenyl and naphthyl radicals and the ring-substituted alkyl and chlorine derivatives thereof, and R, R' and R'' are taken from the group consisting of hydrogen and alkyl radicals having from 1 to 6 carbon atoms.

2. The method of claim 1 in which the aromatic biguanide employed is phenyl biguanide.

3. The method of claim 1 in which the aromatic biguanide employed is o-tolyl biguanide.

4. The method of claim 1 in which the aromatic biguanide employed is N'-phenyl-N''-diethyl biguanide.

5. The method of claim 1 in which the fibrous material employed is glass.

6. The method of claim 1 in which the fibrous material employed is alpha cellulose paper.

References Cited in the file of this patent

UNITED STATES PATENTS

| | | |
|---|---|---|
| 2,285,750 | Swain | June 9, 1942 |
| 2,331,376 | D'Alelio | Oct. 12, 1943 |
| 2,331,377 | D'Alelio | Oct. 12, 1943 |
| 2,344,733 | Ripper | Mar. 21, 1944 |
| 2,377,868 | D'Alelio | June 12, 1945 |
| 2,437,799 | Yorke | Mar. 16, 1948 |
| 2,541,005 | Oldham et al. | Feb. 6, 1951 |